United States Patent
Leufstedt

(10) Patent No.: US 8,590,579 B2
(45) Date of Patent: Nov. 26, 2013

(54) INLET FOR A TANK

(75) Inventor: Max Leufstedt, Bjärred (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 619 days.

(21) Appl. No.: 12/867,720

(22) PCT Filed: Dec. 18, 2008

(86) PCT No.: PCT/SE2008/000718
§ 371 (c)(1),
(2), (4) Date: Aug. 25, 2010

(87) PCT Pub. No.: WO2009/104997
PCT Pub. Date: Aug. 27, 2009

(65) Prior Publication Data
US 2011/0017344 A1    Jan. 27, 2011

(30) Foreign Application Priority Data
Feb. 22, 2008 (SE) ........................ 0800408

(51) Int. Cl.
*B65B 1/04* (2006.01)
(52) U.S. Cl.
USPC ............. 141/1; 141/290; 239/1; 239/524; 137/592; 222/145.6; 222/318; 222/424; 220/86.1
(58) Field of Classification Search
USPC ............ 141/1, 67, 290; 239/1, 518, 524, 601; 137/592; 220/86.1; 222/145.5, 145.6, 222/318, 424
See application file for complete search history.

(56) References Cited

U.S. PATENT DOCUMENTS

| 1,699,196 A | 1/1929 | Kristoffersson |
| 1,734,966 A | 11/1929 | Elmendorf |
| 3,109,593 A * | 11/1963 | Newland, Sr. ................ 239/275 |

FOREIGN PATENT DOCUMENTS

| FR | 1477600 | 3/1967 |
| GB | 734037 | 7/1955 |
| GB | 1007304 | 10/1965 |
| WO | WO 2005/034612 A1 | 4/2005 |

OTHER PUBLICATIONS

International Search Report (PCT/ISA/210) issued on Jun. 10, 2009, by Swedish Patent Office as the International Searching Authority for International Application No. PCT/SE2008/000718.

* cited by examiner

*Primary Examiner* — Jason K Niesz
(74) *Attorney, Agent, or Firm* — Buchanan Ingersoll & Rooney PC

(57) ABSTRACT

The invention relates to an inlet for a tank which is intended for a liquid food product. The inlet is placed in the side wall of the tank and at the upper end of the tank. The inlet is further designed so that the inflowing product is distributed in fan-shape along the inside of the tank. The application also includes a method of supplying liquid food product to a tank.

15 Claims, 4 Drawing Sheets

INLET FOR A TANK

TECHNICAL FIELD

The present invention relates to an inlet for a tank, intended for a liquid food product, where the inlet is placed in the side wall of the tank and at the upper end of the tank.

The present invention also relates to a method of supplying a liquid food product to a tank, and where such supply takes place above the liquid surface of the tank.

BACKGROUND ART

When a liquid food is processed, situations occasionally arise where the product must be circulated across a balance tank. The process may be some type of heat treatment, such as pasteurization or UHT-treatment (Ultra High Temperature). Other processes may also occur. A situation which may occur is, for example, when the correct temperature has not been reached in the heat treatment equipment. The liquid food product may be some form of dairy produce, such as milk, cream or the like.

When a liquid food product is circulated over a balance vessel or tank, it is almost inevitable that air will be admixed into the product. Air in a dairy product which is to be heat treated markedly increases the risk of fouling, i.e. burning of the product onto surfaces in the heat treatment equipment. Air also affects the standardization of milk products in that a lower level of accuracy will be achieved. There will also be a reduction of accuracy in other measurement equipment. Air in a food product also has a harmful effect of the homogenization of, for example, milk.

One method of avoiding the admixture of air into the food product is that the inlet in the balance tank or vessel is positioned below the liquid surface of the tank. This is an efficient method of avoiding the admixture of air, but unfortunately suffers from the drawback that there is a slight risk that treated product will be mixed with untreated product. In some countries, there is moreover legislation in place which prevents the adoption of such a solution.

OBJECTS OF THE INVENTION

One object of the present invention is to realise an inlet for a tank which minimizes the admixture of air in the product.

A further object of the present invention is to avoid the risk that treated product be mixed with untreated product if the product must be circulated over a balance tank.

Yet a further object of the present invention is that the inlet according to the invention may be employed for all types of tanks, all types of food processes, as well as all types of liquid food products, where air has a harmful effect on the process.

Solution

These and other objects have been attained according to the present invention in that the inlet inside the tank is designed so that the inflowing products is distributed in fan-shape along the inside of the tank.

These and other objects have further been attained according to the present invention in that the tank is provided with an inlet which distributes the inflowing product in fan-shape along the inside of the tank.

Preferred embodiments of the present invention have further been given the characterising features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings. In the accompanying Drawings:

FIG. 1 schematically illustrates a flow diagram with a balance tank according to the prior art;

DESCRIPTION OF PREFERRED EMBODIMENT

Figure 1:
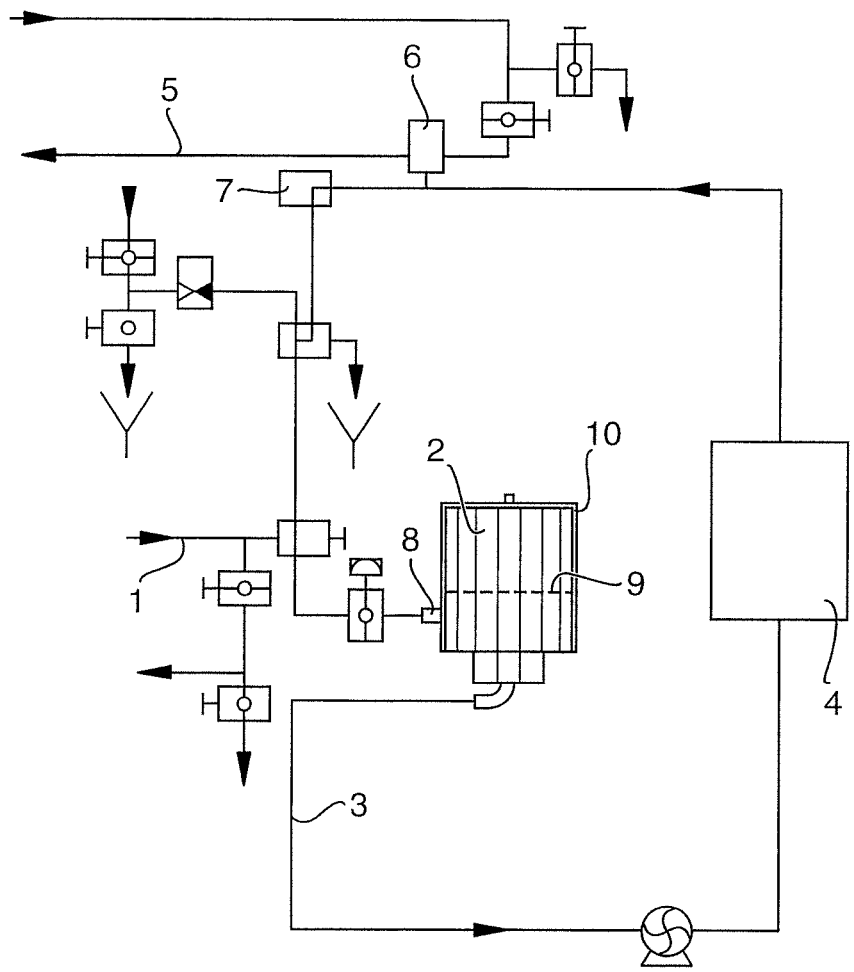

In FIG. 1, untreated product enters through a conduit 1, passes a balance tank 2 and continues via a conduit 3 to a heat treatment equipment unit 4. The heat treatment equipment unit 4 may be a pasteurizer, an UHT unit (Ultra High Temperature) or some other form of process equipment which requires circulation over a balance tank 2.

When the correct temperature has been reached in the heat treatment equipment 4, the treated product passes out through a conduit 5. If the correct temperature has not been reached, a valve 6 closes and another valve 7 opens so that the product enters into the balance tank 2. In FIG. 1, which illustrates the prior art, the inlet 8 of the balance tank 2 is disposed in the lower region of the tank 2, below the liquid surface 9. Until the correct temperature has been reached in the heat treatment equipment 4, the product will be circulated over the balance tank 2. The drawback inherent in the above-outlined circulation and the low positioning of the inlet 8 in the balance tank 2 is that there is a slight risk that untreated product may be mixed together with treated product.

Figure 2:
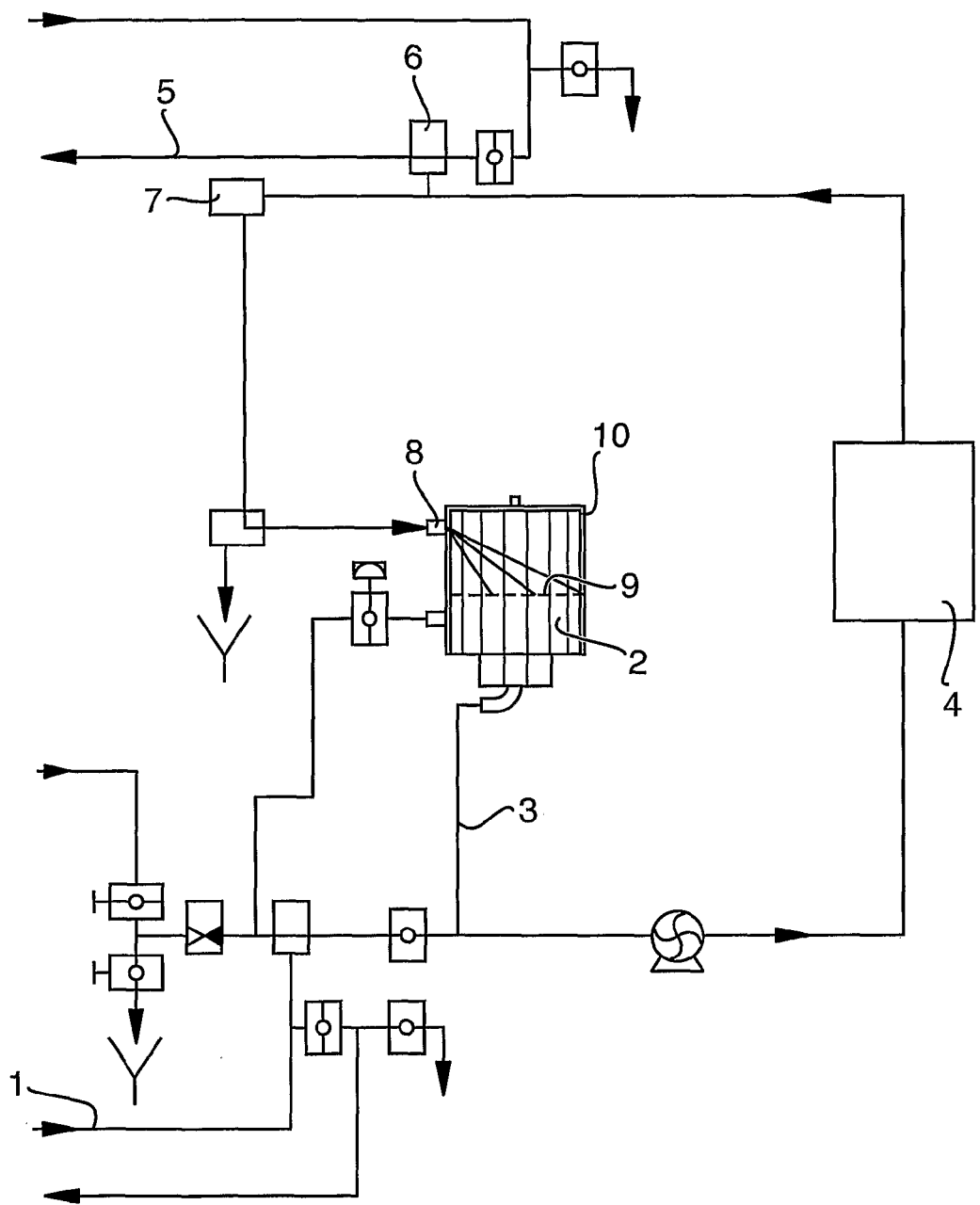
FIG. 2 shows a schematic flow diagram with a balance tank with an inlet according to the present invention.

FIG. 2 illustrates a circulation over a balance tank 2 where the tank 2 has an inlet 8 according to the present invention. In FIG. 2, untreated product enters through a conduit 1 and continues to a heat treatment equipment unit 4. The heat treatment equipment unit 4 may be a pasteurizer, an UHT-treatment equipment unit (Ultra High Temperature) or some other form of process equipment which requires circulation over a balance tank 2.

When the correct temperature has been reached in the heat treatment equipment 4, the treated product passes out through a conduit 5. If the correct temperature has not been reached, a valve 6 closes and another valve 7 opens so that the product enters into the balance tank 2. The inlet 8 is positioned in the side wall 11 of the tank 2 and at the upper end of the tank 2. Until the correct temperature has been reached in the heat treatment equipment 4, the product will be circulated over the balance tank 2.

Figure 4:
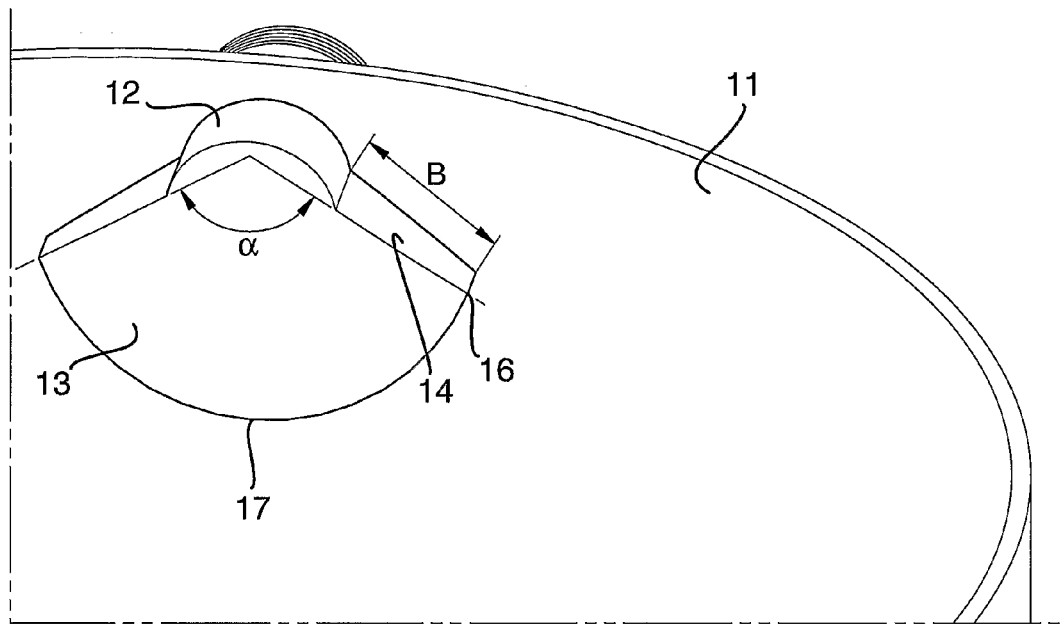
FIG. 4 is a three-dimensional view of an inlet according to the present invention.
Figure 5:
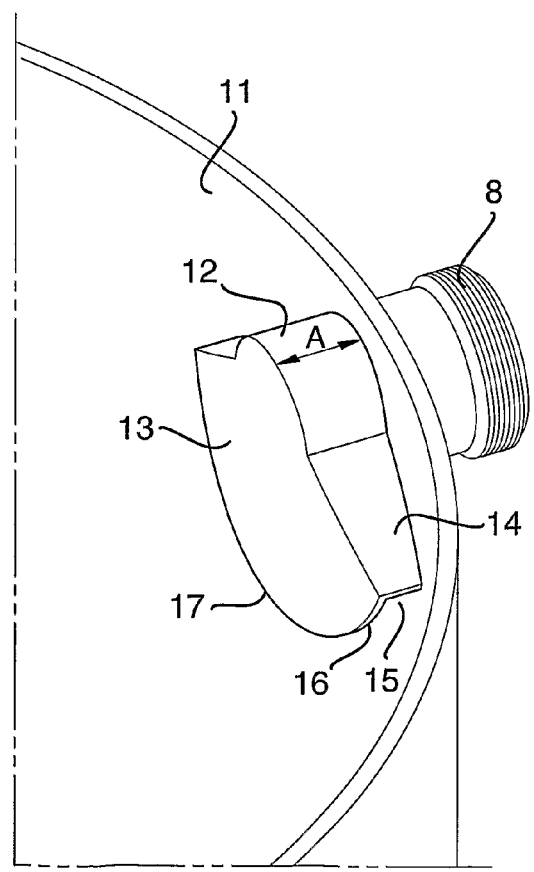
FIG. 5 shows another three-dimensional view of an inlet according to the present invention.

The inlet 8 according to the present invention is shown in detail in FIG. 4 and FIG. 5. The balance tank 2, which is normally covered with an upper section 10, is here illustrated without said upper section 10. The inlet 8 passes through the side wall 11 of the tank 2 at the upper end of the tank 2. The inlet 8 discharges in a pipe socket 12 which is thus fixedly secured against the inside of the tank 2. The socket 12 has a downwardly directed opening with a span of 90-130°, preferably 100-120° and in the preferred embodiment 110°. The span is illustrated in FIG. 4 as the angle $\alpha$.

In direct connection with the socket 12 and its opening, there is disposed a fan-shaped disk 13. The disk 13 has a span which corresponds to the span of the opening of the socket 12, i.e. 90-130°, preferably 100-120° and in the preferred embodiment 110°. The disk 13 also has side portions 14 which entail that the opening of the socket 12 is completely enclosed by means of the disk 13 and the side portions 14.

The disk 13 is further arched so that it follows the rounded inside of the side wall 11 of the tank 2. Moreover, the disk 13 is bulged downwards, so that the gap 15 which occurs between the disk 13 and the side wall 11 of the tank 2 is approx. 2 cm at a point 16, located at the outer definition of the disk 13, and the gap 15 is further approx. 1 cm at a point 17, at the central region of the disk 11

As a result of the design of the gap 15, so that it will be wider out towards the outer definition 16 of the disk 13, an inlet 8 according to the present invention is capable of handling capacities of 5,000-20,000 l/h. When the flow rate of product is low (5,000 l/h) the flow distributes in fan-shape from the central region 17 of the disk 13 halfway out towards the outer definition 16 of the disk 13. When the product flow rate is high (20,000 l/h) the flow distributes in fan-shape from the central region 17 of the disk 13 all the way out to the outer definition 16 of the disk 13.

Figure 3:
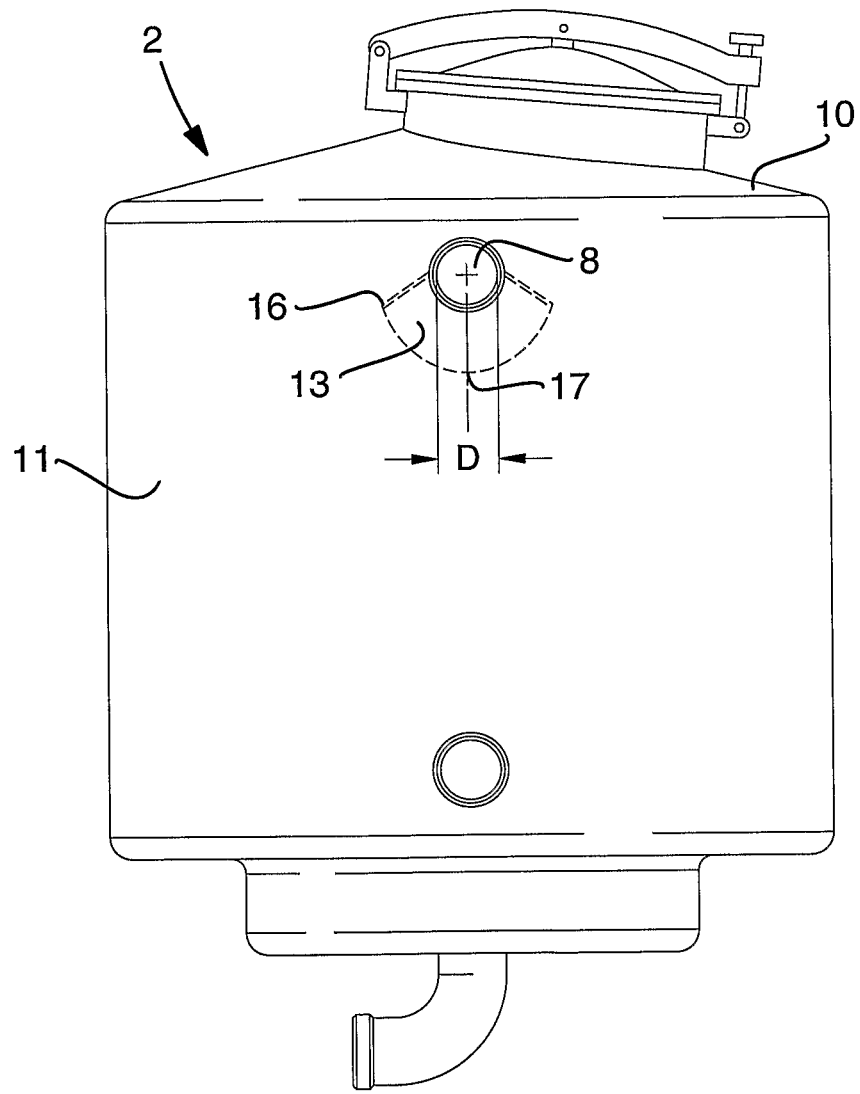
FIG. 3 is a side elevation of a balance tank with an inlet according to the present invention.

The socket 12 of the inlet 8 has a length A which is 5-10 cm, preferably the length A is 7-8 cm. The disk 13 has a length B which corresponds to 1-1.5 times the diameter D of the inlet. The diameter D of the inlet is illustrated in FIG. 3.

The inlet 8 is wholly manufactured of stainless steel so as to meet the extremely stringent hygiene requirements of the food industry. Other materials may also occur, such as food-approved plastics. The design of the inlet 8 makes it easy to clean using the CIP-equipment (Cleaning In Place) of the plant.

Trials have demonstrated that an inlet 8 in, for example, a balance tank 2 which enters straight into the tank 2 above the liquid surface 9 of the tank 2 gives an admixture of air of approx. 3%. The longer time the product must be circulated over the balance tank 2, the more air will be admixed into the product. Corresponding trials with an inlet 8 according to the present invention demonstrate a possible admixture of air which is no longer capable of being measured.

An air admixture of a few percent would also affect the product and there is, among other things, an increased risk of fouling of the product in the heat treatment equipment 4. Standardization of milk products is also affected by air admixture in that there will be a lower level of accuracy of the mixing ratios in the standardization. Other measurement equipment also suffers from a lower level of accuracy if the product contains air. Homogenization of milk products similarly suffers from poorer results if the milk product contains air.

An inlet 8 according to the invention and according to the foregoing description may be employed for all types of tanks 2 where the intention is to obtain a controlled inflow of product. The inlet 8 may further by employed in a plurality of processes and for different types of products, which are negatively affected by an admixture of air.

As will have been apparent from the foregoing description, the present invention realises a tank inlet which minimizes the admixture of air in the inflowing product. The inlet makes it possible for the product to be fed to the tank above the existing liquid surface, which may be a mandatory requirement in some countries.

What is claimed is:

1. An inlet for a tank, intended for a liquid food product, where the inlet is positioned in the side wall of the tank and at the upper end of the tank, wherein the inlet inside the tank discharges in a socket with a downwardly directed opening which is designed so that the inflowing product is distributed in a fan-shape along the inside of the tank.

2. The inlet as claimed in claim 1, wherein the downwardly directed opening of the socket extends 90-130°, and wherein there extends from the opening a fan-shaped disk which has a corresponding span of 90-130°.

3. The inlet as claimed in claim 2, wherein the opening and the disk have a span of 100-120°.

4. The inlet as claimed in claim 2, wherein the opening and the disk have a span of 110°.

5. The inlet as claimed in claim 2, wherein the disk is arched along the side wall of the tank; and the disk is slightly bulged downwards, so that a gap is formed between the disk and the side wall of the tank, the gap being 2 cm at outer definitions of the disk and 1 cm at a central region of the disk.

6. The inlet as claimed in claim 1, wherein the socket has a length which is 5-10 cm.

7. The inlet as claimed in claim 1, wherein the socket has a length which is 7-8 cm.

8. The inlet as claimed in claim 2, wherein the disk has a length which corresponds to 1-1,5 times a diameter of the inlet.

9. A method of supplying a liquid food product to a tank, comprising: supplying the liquid food to an inlet which passes through a side wall of the tank so the liquid food enters the tank as inflowing product, the inlet being positioned above a liquid surface in the tank so the liquid food enters the tank above the liquid surface in the tank, the tank possessing an inside; and the inlet discharging in a socket with a downwardly directed opening for distributing the inflowing product in fan-shape along the inside of the tank.

10. The method according to claim 9, wherein the liquid product in the inlet is discharged into a socket fixed to the insider of the tank, the inflowing product being distributed downwardly into the tank in the fan-shape by virtue of a downwardly directed opening in the socket.

11. The method according to claim 9, wherein the fan-shape distribution of the inflowing product along the inside of the tank comprises distributing the inflowing product into the tank by way of a downwardly directed opening of a socket, the opening of the socket spanning 90-130°.

12. A balance tank through which liquid food product circulates, the tank comprising a side wall possessing an inner surface, an inlet positioned in the side wall of the tank and passing through the side wall of the tank, the inlet being located at an upper end of the tank so that the liquid food product enters the tank above a liquid surface of liquid in the tank, the inlet being connected to a socket which possesses a downwardly directed opening which opens into the tank, the downwardly directed opening spanning less than 360° so that the liquid food product exiting the opening of the socket is distributed in fan-shape along the inside of the tank.

13. The balance tank as claimed in claim 12, wherein the opening of the socket spans 90-130°.

14. The balance tank as claimed in claim 13, further comprising a disk with side portions, the disk with side portions completely enclosing the opening of the socket, and the disk being fan-shaped and spanning 90-130°.

15. The balance tank as claimed in claim 12, further comprising a disk with side portions, the disk with side portions completely enclosing the opening of the socket, and the disk being fan-shaped and spanning 90-130°.

* * * * *